United States Patent
Yoshida

(10) Patent No.: US 9,455,471 B2
(45) Date of Patent: Sep. 27, 2016

(54) ELECTRODE FOR ALL SOLID-STATE SECONDARY BATTERY AND METHOD FOR PRODUCING SAME

(71) Applicant: ZEON CORPORATION, Tokyo (JP)

(72) Inventor: Naoki Yoshida, Tokyo (JP)

(73) Assignee: ZEON CORPORATION, Tokyo (JP)

(*) Notice: Subject to any disclaimer, the term of this patent is extended or adjusted under 35 U.S.C. 154(b) by 166 days.

(21) Appl. No.: 14/388,782

(22) PCT Filed: Mar. 27, 2013

(86) PCT No.: PCT/JP2013/059080
§ 371 (c)(1),
(2) Date: Sep. 26, 2014

(87) PCT Pub. No.: WO2013/146916
PCT Pub. Date: Oct. 3, 2013

(65) Prior Publication Data
US 2015/0086875 A1    Mar. 26, 2015

(30) Foreign Application Priority Data

Mar. 28, 2012    (JP) ................. 2012-074498

(51) Int. Cl.
| | |
|---|---|
| *H01M 10/0562* | (2010.01) |
| *H01M 10/052* | (2010.01) |
| *H01M 4/62* | (2006.01) |
| *H01M 4/04* | (2006.01) |
| *H01M 4/1397* | (2010.01) |
| *H01M 10/0525* | (2010.01) |
| *H01M 4/139* | (2010.01) |

(52) U.S. Cl.
CPC ....... *H01M 10/0562* (2013.01); *H01M 4/0404* (2013.01); *H01M 4/0471* (2013.01); *H01M 4/139* (2013.01); *H01M 4/1397* (2013.01); *H01M 4/622* (2013.01); *H01M 10/052* (2013.01); *H01M 10/0525* (2013.01); *H01M 2300/0068* (2013.01); *Y02E 60/122* (2013.01)

(58) Field of Classification Search
None
See application file for complete search history.

(56) References Cited

U.S. PATENT DOCUMENTS

| | | | | |
|---|---|---|---|---|
| 2013/0022867 A1 | 1/2013 | Suzuki | | |
| 2013/0040206 A1* | 2/2013 | Yoshida | ............... | H01M 2/145 429/307 |
| 2013/0266873 A1* | 10/2013 | Ishii | .................... | H01M 2/1653 429/246 |
| 2014/0154569 A1* | 6/2014 | Maeda | ............... | H01M 4/0404 429/211 |

FOREIGN PATENT DOCUMENTS

| | | | | | |
|---|---|---|---|---|---|
| JP | 08-157677 | A | | 6/1996 | |
| JP | 08157677 | A | * | 6/1996 | |
| JP | 2001-102056 | A | | 4/2001 | |
| JP | 2009-289534 | A | | 12/2009 | |
| JP | 2010-186682 | A | | 8/2010 | |
| JP | 2010-245024 | A | | 10/2010 | |
| JP | WO 2012057324 | A1 | * | 5/2012 | ......... H01M 2/1653 |
| WO | 2011/086983 | A1 | | 7/2011 | |
| WO | 2011/142083 | A1 | | 11/2011 | |
| WO | 2012/026583 | A1 | | 3/2012 | |

OTHER PUBLICATIONS

International Search Report; PCT/JP2013/059080; Jun. 25, 2013.
International Preliminary Report on Patentability and translation of Written Opinion of the International Searching Authority; PCT/JP2013/059025 issued on Oct. 1, 2014.

* cited by examiner

*Primary Examiner* — Gregg Cantelmo
(74) *Attorney, Agent, or Firm* — Studebaker & Brackett PC

(57) ABSTRACT

An electrode for all-solid-state secondary batteries, which is capable of improving the high-temperature cycle characteristics of an all-solid-state secondary battery, includes a collector, a conductive adhesive layer and an electrode mixture layer. The electrode mixture layer contains a binder, an inorganic solid electrolyte that contains sulfur atoms, and an electrode active material. The conductive adhesive layer contains conductive particles and a binder for adhesive layers, the binder being composed of a diene polymer. The diene polymer contains 10-75% by mass of a diene monomer unit, and has an iodine number of 5-350 mg/100 mg. The sulfur atoms contained in the inorganic solid electrolyte and carbon-carbon double bonds of the diene polymer are crosslinked with each other.

15 Claims, No Drawings

ELECTRODE FOR ALL SOLID-STATE SECONDARY BATTERY AND METHOD FOR PRODUCING SAME

TECHNICAL FIELD

The present invention relates to an electrode used for an all solid-state secondary battery such as all solid-state lithium ion secondary battery.

BACKGROUND ART

Recently, the demand for the secondary battery of the lithium battery or so has increased for variety of use not only for the portable terminals such as the portable information terminal or the portable electronic devices or so but also for the use of the compact power storage device for home use, the motorcycle, the electric vehicle, the hybrid electric vehicle or so.

As the use of the secondary battery has become wider, further safety improvements are in demand. In order to secure the safety, the method of using the inorganic solid electrolyte is thought to be used, instead of the organic solvent electrolyte which has a risk of fluid leakage, and also has high risk of catching a fire during the leaking.

Patent document 1 describes the all solid-state secondary battery using the electrode having an electrode material mixture layer on the current collector via the conductive resin layer. Also, it describes that the binder made of polybutadiene resin is included in the conductive resin layer.

PRIOR ART DOCUMENT

Patent document 1: JP Patent Application Laid Open No. 2009-289534

SUMMARY OF THE INVENTION

Technical Problems to be Solved by the Invention

However, according to the keen examination by the present inventors, for the all solid-state secondary battery of the patent document 1, there was a risk that the high temperature cycle characteristic may decline.

Therefore, the present invention has been achieved in view of such problems, and its object is to provide the electrode for the all solid-state secondary battery capable of improving the high temperature characteristic of the all solid-state secondary battery.

Means for Solving the Problems

As a result of keen examination by the present inventors in order to solve the above mentioned problems, it was determined that the cause of the high temperature cycle characteristic decline of the all solid-state secondary battery was due to the carbon-carbon double bond of the binder in the conductive adhesive agent layer. In the polybutadiene resin described in the patent document 1, it was found that the carbon-carbon double bond remains in the polymer thereof in a large quantity. Thus, as a result of a keen examination, it was found that the above problem can be solved by using a specific polymer as the binder used in the conductive adhesive agent layer, or by going through a specific production steps, thereby the present invention was achieved.

The gist of the present invention wherein the object thereof is to solve such problem is as follows.

(1) An electrode for an all solid-state secondary battery comprising a current collector, a conductive adhesive agent layer and an electrode material mixture layer, wherein said electrode material mixture layer includes a binder, an inorganic solid electrolyte having sulfur atom, and an electrode active material, said conductive adhesive agent layer includes a conductive particle, and an adhesive agent binder comprising a diene based polymer, said diene based polymer has 10 to 75 wt % of diene based monomer units and an iodine value is 5 to 350 mg/100 mg; and the sulfur atom included in said inorganic solid electrolyte and a carbon-carbon double bond of said diene based polymer are crosslinked.

(2) The electrode for the all solid-state secondary battery as set forth in (1), wherein said diene based polymer is one or two or more selected from the group consisting of styrene-butadiene copolymer, styrene-isoprene copolymer, isobutylene-isoprene copolymer, ethylene-propylene-diene copolymer, acrylonitrile-butadiene copolymer and hydrogenates thereof.

(3) The electrode for the all solid-state secondary battery as set forth in (1) or (2) wherein, said inorganic solid electrolyte is sulfide glass and/or sulfide glass ceramics comprising $Li_2S$ and $P_2S_5$, or ceramics comprising $Li_2S$, $P_2S_5$, and $GeS_2$.

(4) The electrode for the all solid-state secondary battery as set forth in any one of (1) to (3), wherein said conductive adhesive agent layer includes a vulcanization accelerator which accelerates a crosslinking reaction between the sulfur atom included in said inorganic solid electrolyte and carbon carbon double bond of said diene based polymer.

(5) An all solid-state secondary battery comprising a positive electrode, a solid electrolyte layer and a negative electrode, wherein at least one of the positive electrode and the negative electrode is the electrode for the all solid-state secondary battery as set forth in any one of (1) to (4).

(6) A production method of the electrode for the all solid-state secondary battery as set forth in any one of (1) to (4) comprising, a step of forming a conductive adhesive agent layer including the conductive particle and the adhesive agent layer binder comprising the diene based polymer having carbon-carbon double bond, a step of coating an electrode slurry including the binder, the inorganic solid electrolyte having sulfur atom, and the electrode active material on said conductive adhesive agent layer, a step of drying said electrode slurry which has been coated, and said step of drying includes a step of drying at 25 to 90° C., and a step of drying at 100 to 200° C.

Effect of the Present Invention

According to the present invention, by using the diene based polymer in the conductive adhesive agent layer, the carbon-carbon double bond included in the diene based polymer, and the sulfur atom of the solid electrolytes included in the electrode material mixture layer undergoes the crosslinking reaction, thereby the electrode for all solid-state secondary battery having excellent peel strength (hereinafter, it may be simply referred as "the adhesive strength")

can be obtained. Also, by setting the ratio of the diene based monomer unit included in the diene based polymer with in specific range, the carbon-carbon double bond remaining in the electrode can be made less. As a result, the all solid-state secondary battery having excellent high temperature cycle characteristic can be obtained.

EMBODIMENTS TO CARRY OUT THE INVENTION

The Electrode for the all Solid-State Secondary Battery

The electrode for the all solid-state secondary battery of the present invention comprises the current collector, the conductive adhesive agent layer and the electrode material mixture layer. Hereinafter, the current collector, the conductive adhesive agent layer and the electrode material mixture layer will be described in a detail in this order.

(The Current Collector)

The current collector is not particularly limited as long as it is a material having the conductivity and the electrochemical resistance, and preferably it is a metal material for example, copper, aluminum, nickel, titanium, tantalum, gold, platinum or so may be mentioned since it comprises the heat resistance. Among these, aluminum is particularly preferable as the positive electrode, and copper is particularly preferable as the negative electrode. The shape of the current collector is not particularly limited; however it preferably has a sheet form having the thickness of 0.001 to 0.5 mm or so. The current collector is preferably used by carrying out the roughening treatment in advance in order to increase the binding strength with the conductive adhesive agent layer. As the roughening method, the mechanical abrasive method, the electrolyte abrasive method, the chemical abrasive method or so may be mentioned. As the mechanical abrasive method, the coated abrasive adhered with the abrasive particle, the grind stone, the emery wheel and the wire brush equipped with steel wire or so may be used.

(The Conductive Adhesive Agent Layer)

By forming the conductive adhesive agent layer on the surface of the current collector, the peel strength of the electrode for the all solid-state secondary battery of the present invention can be improved. The larger the peel strength is, the more excellent the binding property between the current collector and the electrode material mixture layer is.

The conductive adhesive agent layer includes the conductive particle and the adhesive agent layer binder comprising diene based polymer. By including the conductive particle and the adhesive agent layer binder comprising the diene based polymer in the conductive adhesive agent layer, the internal resistance of the electrode for the all solid-state secondary battery according to the present invention can be reduced, and the binding property between the current collector and the electrode material mixture layer can be enhanced, thus the output characteristic of the all solid-state secondary battery using said electrode can be improved.

The Conductive Particle

The conductive particle is not particularly limited; however the carbon particle is preferably used. As the carbon particle, graphite having high conductivity due to the presence of π electron which is delocalized (specifically, natural graphite, artificial graphite or so); carbon black which is a spherical aggregate having a turbostratic structure formed of a combination of some layers of graphitic carbon microcrystal (e.g., acetylene black, ketjen black, other furnace black, channel black, and thermal lamp black or so); a carbon fiber; and a carbon whisker or so may be mentioned. Among these, graphite and carbon black are particularly preferable since the carbon particles can be packed in the conductive adhesive agent layer with high density, electron transfer resistance can be reduced, and the internal resistance of the electrode can be further reduced.

Said carbon particles mentioned in the above may be used alone, or by combining two or more thereof. Specific examples of the combination may include combinations of graphite and carbon black, graphite and carbon fibers, graphite and carbon whiskers, carbon black and carbon fibers, and carbon black and carbon whiskers or so may be mentioned. The combinations of graphite and carbon black, graphite and carbon fibers, and carbon black and carbon fibers are preferable, and the combinations of graphite and carbon black, and graphite and carbon fibers are particularly preferable. When carbon particles of said combinations are used, the carbon particles are packed in the conductive adhesive layer with high density. Thus, electron transfer resistance is further reduced, and the internal resistance of the lithium ion secondary battery is further reduced. Therefore, they are preferable.

The electric resistivity of the carbon particles is preferably 0.0001 to 1 $\Omega \cdot cm$, more preferably 0.0005 to 0.5 $\Omega \cdot cm$, and particularly preferably 0.001 to 0.1 $\Omega \cdot cm$. When the electric resistivity of the carbon particles falls within the range, the electron transfer resistance of the conductive adhesive layer can be reduced, and the internal resistance of the electrode can be reduced. The electric resistivity is determined by calculating the electric resistivity $\rho$ ($\Omega \cdot cm$)=$R \times (S/d)$ from a resistance value R ($\Omega$) converged against the pressure and an area S ($cm^2$) and a thickness d (cm) of the compressed carbon particle layer in which a resistance value is measured using a powder resistance measuring system (model MCP-PD51; manufactured by DIA Instruments Co., Ltd.) while applying a pressure to the carbon particles.

The volume average particle diameter of the carbon particle is preferably 0.01 to 20 μm, more preferably 0.05 to 15 μm, and particularly preferably 0.1 to 10 μm. When the volume average particle diameter of the carbon particles falls within this range, the carbon particles are packed in the conductive adhesive layer with high density. Thus, electron transfer resistance can be reduced, and the internal resistance of the electrode is further reduced. The volume mean particle diameter is the value obtained by a laser diffraction particle size distribution measurement device (SALD-3100; manufactured by Shimadzu Corporation).

The Adhesive Agent Layer Binder

The adhesive agent layer binder comprises diene based polymer. The diene based polymer is a copolymer obtained by polymerizing the monomer mixture comprising the conjugated diene, or the hydrogenates thereof; and it includes 10 to 75 wt %, preferably 15 to 70 wt %, and more preferably 20 to 65 wt % of the monomer unit derived from the conjugated diene (the diene based monomer unit). In case the content ratio of the diene based monomer unit in the diene based polymer is less than 10 wt %, the crosslinking between the sulfur atom included in the below described inorganic solid electrolytes become insufficient, thus the binding property between the conductive adhesive agent layer and the electrode material mixture layer declines. As a result, the peel strength of the electrode for the all solid-state secondary battery declines. Also, when the content ratio of the diene based monomer unit in the diene based polymer exceeds 75 wt %, excessive amount of the carbon-carbon double bond remains in the electrode, thus the high temperature cycle characteristic declines. By using the diene based polymer having the content ratio of the diene based monomer unit within said range, the conductive adhesive agent layer with excellent flexibility can be formed. Also, the crosslinking reaction takes place between the carbon-carbon double bond included in the diene based monomer unit and the sulfur atom included in the below described inorganic solid electrolytes thereby the crosslinking structure is formed between the carbon-carbon double bond and the sulfur atom; thus the binding property between the conductive adhesive agent layer and the electrode material mixture layer improves, and the electrode for the all solid-state secondary battery having high peel strength can be obtained. Further, by using said electrode, the all solid-state secondary battery having excellent cycle characteristic (particularly the high temperature cycle characteristic) can be obtained.

As the conjugated diene, 1,3-butadiene, isoprene, 2-chloro-1,3-butadiene, chloroprene, pentadiene or so may be mentioned. Among these, 1,3-butadiene is preferable.

Also, the diene based polymer includes other monomer units besides the diene based monomer unit. As other monomer unit, it is not particularly limited, however the monomer unit derived from aromatic vinyl monomer, the monomer unit copolymerizable with the monomer unit derived from the diene based monomer unit or the aromatic vinyl monomer unit or so may be mentioned. The content ratio of other monomer unit in the diene based polymer is preferably 25 to 90 wt %, more preferably 30 to 85 wt %, and particularly preferably 35 to 80 wt %.

As the aromatic vinyl monomer, styrene, chlorostyrene, vinyl toluene, t-butyl styrene, vinyl benzoate, vinyl methyl benzoate, vinyl naphthalate, chloromethyl styrene, hydroxymethyl styrene, α-methyl styrene, divinylbenzene or so may be mentioned. Among these, styrene, α-methyl styrene, divinyl benzene is preferable.

As the copolymerizable monomer, olefins such as ethylene, propylene, isobutylene or so; α,β-unsaturated nitrile compounds such as acrylonitrile, methacrylonitrile or so; unsaturated carboxylic acids such as acrylic acid, methacrylic acid, itaconic acid, fumaric acid or so; halogen atom containing monomers such as vinyl chloride, vinylidene chloride or so; vinyl esters such as vinyl acetate, vinyl propionate, vinyl lactate, vinyl benzoate or so; vinyl ethers such as methyl vinyl ether, ethyl vinyl ether, butyl vinyl ether or so; vinyl ketones such as methyl vinyl ketone, ethyl vinyl ketone, butyl vinyl ketone, hexyl vinyl ketone, isopropenyl vinyl ketone or so; heterocycle containing vinyl compound such as N-pyrrolidone, vinyl pyridine, vinyl imidazole or so may be mentioned.

As the specific example of diene based polymer, styrene-butadiene copolymer (SBR), styrene-isoprene copolymer, isobutylene-isoprene copolymer (butylene rubber), ethylene-propylene-diene copolymer, acrylonitrile-butadiene copolymer (NBR), hydrogenated SBR, hydrogenated NBR or so may be mentioned; and SBR or NBR are preferably used. These polymers may be used alone or by combining two or more thereof. By using the adhesive agent layer binder comprising the above mentioned polymer, the binding property between the electrode material mixture layer and the current collector becomes excellent.

The method of obtaining the diene based polymer is not particularly limited, however by using the above mentioned monomers, radical polymerization, anionic polymerization, cationic polymerization, coordinate anionic polymerization, coordinate cationic polymerization or so may be mentioned. The polymerization is carried out under the presence of the polymerization initiator, and preferably at the temperature range of 0 to 150° C., more preferably 10 to 100° C., and particularly preferably of 20 to 80° C. In case of the living radical polymerization, as the polymerization initiator, for example, organic monolithium such as n-butyl lithium, sec-butyl lithium, t-butyl lithium, hexyl lithium, phenyl lithium or so; polyfunctional organic lithium compounds such as dilithiomethane, 1,4-dilithiobutane, 1,4-dilithio-2-ethylcyclohexane or so can be used.

The polymerization embodiment can be any of solution polymerization, slurry polymerization or so; however if solution polymerization is used, the removal of the reaction heat can be done easily. In this case, inactive solvent which dissolves the diene based polymer is used. As for the inactive solvent used, for example, aliphatic hydrocarbons such as n-butane, n-pentane, isopentane, n-hexane, n-heptane, isooctane or so; alicyclic hydrocarbons such as cyclopentane, cyclohexane, methylcyclo pentane, methylcyclohexane, decalin, bicycle[4.3.0]nonane, tricycle[4.3.0.1$^{2,5}$] decane or so; aromatic hydrocarbons such as benzene, toluene or so may be mentioned. These solvents may be used alone or by combining two or more thereof. The used amount of these solvents is usually 200 to 2000 parts by weight with respect to 100 parts by weight of entire used amount.

When obtaining the diene based polymer, in case the monomer used is two or more, in order to prevent from growing a chain of one particular component, a randomizer can be used. Particularly, in case the polymerization reaction is carried out by the anionic polymerization, it is preferable to use a Louis base compound or so as the randomizer. As the Louis base compound, for example, ethers such as dimethyl ether, diethyl ether, diisopropyl ether, dibutyl ether, tetrahydrofuran, diphenyl ether, ethyleneglycoldiethyl ether, ethyleneglycolmethylphenyl ether or so; tertiary amine compounds such as tetramethylethylene diamine, trimethyl amine, triethyl amine, pyridine or so; alkaline metal alkoxide compounds such as potassium-t-amyloxide, potassium-t-butyloxide or so; phosphine compounds such as triphenylphosphine or so may be mentioned. These Louis base compounds may be used alone or by combining two or more thereof.

The molecular weight of the diene based polymer used in the present invention is selected suitably based on the purpose of use, however the weight average molecular weight (Mw) in terms of polystyrene conversion measured by gel permeation chromatography of cyclohexane solution (if the polymer does not dissolve, it is toluene solution) is usually 10,000 or more, and preferably 30,000 to 200,000, more preferably 40,000 to 150,000, and particularly preferably 50,000 to 100,000. When the molecular weight of the dinene based polymer is within above mentioned range, the slurry for the conductive adhesive agent layer having good coating property can be obtained.

The glass transition temperature (Tg) of the diene based polymer may be selected based on the purpose of use, however it is usually −50 to 50° C., preferably −40 to 30° C., and particularly preferably −30 to 10° C. When the glass transition temperature of the diene based polymer is within the above mentioned range, the slurry for the conductive adhesive agent layer having good coating property can be obtained, and also it is suitable as the heat resistance of the diene based polymer is highly balanced out.

The glass transition temperature is those measured in accordance with JIS K7121; 1987.

The iodine value of the diene based polymer is 5 to 350 mg/100 mg, preferably 10 to 300 mg/100 mg, and further preferably 20 to 250 mg/100 mg. If the iodine value of the diene based polymer exceeds 350 mg/100 mg, the stability of oxidation potential declines due to the carbon-carbon double bond included in the diene based polymer, and as a result, the high temperature cycle characteristic of the battery deteriorates. Also, if the iodine value of the diene based polymer is less than 5 mg/100 mg, then the flexibility of the diene based polymer may decline. As a result, the powder fall off may occur, thus safety and the long term cycle characteristic may deteriorate. By having the iodine value of the diene based polymer within the above mentioned range, the diene based polymer has stable chemical structure against the high electrical potential, thus the electrode structure can be maintained over long term cycle; as a result the high temperature characteristic becomes excellent. The iodine value is obtained in accordance with JIS K6235; 2006.

The gel fraction of the diene based polymer before the crosslink structure is formed between the carbon-carbon double bond of the diene based polymer and the sulfur atom included in the inorganic solid electrolyte (before the crosslink reaction) is preferably 40 to 95%, more preferably 45 to 92%, and further preferably 50 to 90%. By making the gel fraction of the diene based polymer before the crosslink reaction within the above mentioned range, the flexibility of the conductive adhesive agent layer becomes excellent.

The gel fraction of the diene based polymer of the crosslink reaction can be measured by the method described in the following.

The content of the adhesive agent layer binder in the conductive adhesive agent layer is preferably 10 to 150 parts by weight, more preferably 20 to 130 parts by weight, and particularly preferably 30 to 110 parts by weight with respect to 100 parts by weight of the conductive particles. By having the content of the adhesive agent layer binder within the above mentioned range, the conductive adhesive agent layer having excellent binding property and the conductivity can be formed.

The Vulcanization Accelerator

Also, the conductive adhesive agent layer preferably further includes the vulcanization accelerator. In the present invention, the vulcanization accelerator refers to the substance which accelerates the crosslinking reaction between the sulfur atom of the inorganic solid electrolyte included in the electrode material mixture layer and the carbon-carbon double bond of the diene based polymer included in the conductive adhesive agent layer. By including the vulcanization accelerator in the conductive adhesive agent layer, the crosslinking reaction between the sulfur atom of the inorganic solid electrolyte and the carbon-carbon double bond of the diene based polymer is accelerated, hence the electrode for the all solid-state secondary battery having excellent peel strength can be obtained.

As the vulcanization accelerator, sulfenamide based vulcanization accelerator such as N-cyclohexyl-2-benzothiazolesulfenamide, N-t-butyl-2-benzothiazolesufenamide, N-oxyethylene-2-benzothiazolesulfenamide, N-oxyethylene-2-benzothiazolesulfenamide, N,N'-diisopropyl-2-benzothiazolesulfenamide or so; guanidine based vulcanization accelerator such as diorthotolyl guanidine, orthotolylbiguanidine or so; thiourea based vulcanization accelerator; thiazole based vulcanization accelerator; thiuram based vulcanization accelerator; dicarbamine acid based vulcanization accelerator; xanthogen acid based vulcanization accelerator or so may be mentioned. Among these, those including sulfenamide based vulcanization accelerator is particularly preferable from the point of vulcanization speed. These vulcanization accelerators may be used alone or by combining two or more thereof. The blending amount of the vulcanization accelerator is preferably 0.1 to 15 parts by weight, more preferably 0.5 to 5 parts by weight with respect to 100 parts by weight of the solid portion constituting the conductive adhesive agent layer.

Other Components

The conductive adhesive agent layer includes, as the essential components, the conductive particle, and the adhesive agent layer binder comprising the diene based polymer; however as other components, depending on the needs, a resin component, a dispersant for uniformly dispersing these may be included.

As the resin component, for example, polymer compounds such as fluorine based polymer, acrylic based polymer, polyimide, polyamide, polyurethane or so may be mentioned; and acrylic based polymer is preferable from the point of increasing the withstand voltage, and to make the energy density of the electrode higher.

As fluorine based polymer, polytetrafluoroethylene (PTFE), polyvinylidene fluoride (PVDF), a tetrafluoroethylene-hexafluoropropylene copolymer (FEP) or so may be mentioned.

The acrylic based polymer is a polymer including the monomer unit derived from α,β-ethylene unsaturated monocarboxylic acid alkyl esters, specifically, homopolymer of α,β-ethylene unsaturated monocarboxylic acid alkyl esters, copolymer of α,β-ethylene unsaturated monocarboxylic acid alkyl esters, and copolymer of α,β-ethylene unsaturated monocarboxylic acid alkyl esters and other monomers copolymerizable therewith.

As α,β-ethylene unsaturated monocarboxylic acid alkyl esters, acrylates such as methyl acrylate, ethyl acrylate, n-propyl acrylate, isopropyl acrylate, n-butyl acrylate, and t-butyl acrylate, 2-ethylhexyl acrylate, 2-methoxy ethyl acrylate, 2-ethoxyethyl acrylate, benzyl acrylate or so; 2-(perfluoroalkyl)ethyl acrylate such as 2-(perfluorobutyl) ethyl acrylate, 2-(perfluoropentyl)ethyl acrylate or so; alkyl methacrylates such as methyl methacrylate, ethyl methacrylate, n-propyl methacrylate, isopropyl methacrylate, n-butyl methacrylate and t-butyl methacrylate, 2-ethylhexyl methacrylate, lauryl methacrylate, tridecyl methacrylate, stearyl methacrylate, benzyl methacrylate or so; ethyl 2-(perfluoroalkyl) methacrylates such as ethyl 2-(perfluorobutyl) methacrylate, ethyl 2-(perfluoropentyl) methacrylate or so may be mentioned.

The content ratio of the monomer unit derived from α,β-ethylene unsaturated monocarboxylic acid alkyl esters in the acrylic based polymer is usually 40 wt % or more, preferably 50 wt % or more, and further preferably 60 wt % or more. Note that, the upper limit of the monomer unit derived from α,β-ethylene unsaturated monocarboxylic acid alkyl esters in the acrylic based polymer is usually 100 wt % or less, and preferably 95 wt % or less.

Also, as the acrylic based polymer, the copolymer between α,β-ethylene unsaturated monocarboxylic acid alkyl esters and other monomer copolymerizable with said α,β-ethylene unsaturated monocarboxylic acid alkyl esters is preferable. As said copolymerizable monomer, unsaturated carboxylic acids such as acrylic acid, methacrylic acid, itaconic acid, fumaric acid or so; carboxylic acids esters comprising two or more carbon-carbon double bonds such as ethyleneglycoldimethacrylate, diethyleneglycoldimethacrylate, trimethylolpropane triacrylate or so; styrene based monomers such as styrene, chlorostyrene, vinyl toluene, t-butyl styrene, vinyl benzoate, methyl vinyl benzoate, vinyl naphthalene, chloromethylstyrene, hydroxymethylstyrene, α-methylstyrene, divinylbenzene or so; amide based monomers such as acrylic amide, methacrylic amide, N-methylolacrylic amide, acrylic amide-2-methylpropane sulfonate or so; olefins such as ethylene, propylene or so; diene based monomers such as butadiene, isoprene or so; halogen atom containing monomer such as vinyl chloride, vinylidene chloride or so; vinyl esters such as vinyl acetate, vinyl propionate, vinyl lactate, vinyl benzoate or so; vinyl ethers such as methyl vinyl ether, ethyl vinyl ether, butyl vinyl ether or so; vinyl ketones such s methyl vinyl ketone, ethyl vinyl ketone, butyl vinyl ketone, hexyl vinyl ketone, isopropenyl vinyl ketone or so; hetrocycle containing vinyl compounds such as N-vinyl pyrrolidone, vinyl pyridine, vinyl imidazole or so may be mentioned. Among these, from the point of solubility against the below described solvent, styrene based monomers, amide based monomers, α, β-unsaturated nitrile compounds are preferable. The content ratio of said copolymerizable monomer unit in the acrylic based polymer is usually 60 wt % or less, preferably 55 wt % or less, and more preferably 25 wt % or more and 45 wt % or less.

The content ratio of the resin component in the conductive adhesive agent layer is 2 wt % or more, and 50 wt % or less. When the content ratio of the resin component in the conductive adhesive agent layer is within the above mentioned range, the conductive adhesive agent layer having high conductivity and high adhesiveness can be obtained.

As the disperser, cellulose polymers such as carboxymethyl cellulose, methyl cellulose, ethyl cellulose, and hydroxypropyl cellulose and ammonium salts or alkali metal salts thereof; poly(meth)acrylate salts such as sodium poly(meth)acrylate or so; polyvinyl alcohol, modified polyvinyl alcohol, polyethylene oxide; polyvinyl pyrrolidone, polycarboxylic acid, oxidized starch, phosphoric acid starch, casein, various modified starch, chitin, chitosan derivatives or so may be mentioned. These dispersers may be used alone or by combining two or more thereof. Among these, cellulose based polymer is preferable, and carboxymethyl cellulose or the ammonium slats or alkali metal salts thereof is particularly preferable.

The content of the disperser in the conductive adhesive agent layer can be within the range which does not compromise the effect of the present invention, and usually it is 0.1 to 15 parts by weight, preferably 0.5 to 10 parts by weight, more preferably 0.8 to 5 parts by weight with respect to 100 parts by weight of the conductive particles.

The thickness of the conductive adhesive agent layer is not particularly limited; however preferably it is 0.1 to 5 μm, more preferably 0.5 to 2 μm.

(The Electrode Material Mixture Layer)

The electrode material mixture layer includes the binder, the inorganic solid electrolytes including the sulfur atoms, and the electrode active materials.

The Binder

The binder is not particularly limited, and for example polymer compounds such as fluorine based polymer, diene based polymer, acrylic based polymer, silicone based polymer or so can be used. Among these, fluorine based polymer, diene based polymer, or the acrylic based polymer is preferable, and acrylic based polymer is more preferable form the point of making the withstand voltage higher, and to make the energy density of the all solid-state secondary battery higher. As for the fluorine based polymer, diene based polymer, and acrylic based polymer, those already listed in the above as examples of the conductive adhesive agent layer may be mentioned.

As the silicone based polymer, silicone rubber, fluorosilicone rubber, polyimide silicone or so may be mentioned.

The content of the binder in the electrode material mixture layer is preferably 0.1 to 10 parts by weight, more preferably 0.5 to 7 parts by weight, and particularly preferably 0.5 to 5 parts by weight with respect to 100 parts by weight of inorganic solid electrolytes. By having the content of the binder in the electrode material mixture layer within the above mentioned range, the resistance of the electrode material mixture layer can be suppressed from increasing by interfering lithium movement while maintaining the binding property between the inorganic solid electrolyte particles against each other.

The Inorganic Solid Electrolyte

The inorganic solid electrolyte is not particularly limited as long as it includes the sulfur atom, and has lithium ion conductivity; however crystalline inorganic lithium ion conductor or amorphous inorganic lithium ion conductor is preferably included.

As the crystalline inorganic lithium ion conductor, Thio-LISICON ($Li_{3.25}Ge_{0.25}P_{0.75}S_4$) or so may be mentioned; and as amorphous inorganic lithium ion conductor, glass Li—Si—S—O, Li—P—S, Li—Ge—P—S or so may be mentioned. Among these, from the point of the conductivity, amorphous inorganic lithium ion conductor is preferable, and sulfides including Li, P, and S are more preferable. The sulfides including Li, P, and S has high lithium ion conductivity, thus it allows to lower the internal resistance of the battery by using sulfides including Li, P, and S as the inorganic solid electrolytes, and also it can improve the output characteristic.

Also, from the point of lowering the internal resistance of the battery, and of improving the output characteristic, the sulfides including Li, P, and S is preferably sulfide glass comprising $Li_2S$ and $P_2S_5$, and ceramics comprising $P_2S_5$, and $GeS_2$; and particularly preferably it is sulfide glass produced by the mixture of $Li_2S$ and $P_2S_5$, in which the mol ratio of $Li_2S:P_2S_5$ is 65:35 to 85:15. Also, the sulfides including Li, P, and S is preferably the sulfide glass ceramics obtained by carrying out the mechanochemical method to the mixture of $Li_2S$ and $P_2S_5$, in which the mol ratio of $Li_2S:P_2S_5$ is 65:35 to 85:15.

When the inorganic solid electrolytes produced by the mixture of $Li_2S$ and $P_2S_5$, in which the mol ratio of $Li_2S:P_2S_5$ is 65:35 to 85:15 (mol ratio), the lithium ion conductivity can be maintained at high state. From the point as mentioned in the above, it is further preferable to have the range of $Li_2S: P_2S_5$=68:32 to 80:20.

The lithium ion conductivity of the inorganic solid electrolyte is preferably $1\times10^{-4}$ S/cm or more, and further preferably $1\times10^{-3}$ S/cm or more.

The inorganic solid electrolytes used in the present invention is not only the sulfide glasses only comprising Li, P and S, and the sulfide glass ceramics only comprising Li, P and S; but also it may include other materials besides Li, P and S.

Also, the average particle diameter of the inorganic solid electrolytes is preferably within the range of 0.1 to 50 μm in terms of volume average particle diameter. When the average particle diameter of the inorganic solid electrolytes is within the above mentioned range, the solid electrolyte can be easily handled, and also the dispersibility of the inorganic solid electrolytes in the slurry composition when forming into sheet form can be improved thus it becomes easy to form the sheet form. From the points mentioned in the above, the average particle diameter of the inorganic solid electrolytes is further preferably within the range of 0.1 to 20 μm. The average particle diameter can be obtained by measuring the particle size distribution using the laser diffraction.

For the inorganic solid electrolytes used in the present invention, within the range that does not compromise the ion conductivity, at least one sulfide selected from the group consisting of $Al_2S$, $B_2S_3$ and $SiS_2$ is preferably included as the starting material other than the aforementioned $Li_2S$ and $P_2S_5$. By including said sulfides, the glass component in the inorganic solid electrolytes can be stabilized.

Similarly, in addition to $Li_2S$ and $P_2S_5$, lithium orthooxo acid selected from the group consisting of $Li_3PO_4$, $Li_4SiO_4$, $Li_4GeO_4$, $Li_3BO_3$ and $Li_3AlO_3$ are further included. By including orthooxo lithium acid, the glass component in the inorganic solid electrolyte can be stabilized The Electrode Active Material As the electrode active materials used in the electrode for all solid-state secondary battery of the present invention, the electrode active material for the positive electrode (the positive electrode active material) and the electrode active material for the negative electrode (the negative electrode active material) may be mentioned.

The positive electrode active material is a compound capable of absorbing and releasing the lithium ion. The positive electrode active material is separated by in large into those made from inorganic material and those made from organic material.

As for the positive electrode active material made from an inorganic material, a transition metal oxide, a composite oxide of lithium and the transition metal, and the transition metal sulfide or so may be mentioned. As for the above mentioned transition metal, Fe, Co, Ni, Mn or so may be used. As for the specific examples of the inorganic compounds used as the positive electrode active material, lithium containing composite metal oxide such as $LiCoO_2$, $LiNiO_2$, $LiMnO_2$, $LiMn_2O_4$, $LiFePO_4$, $LiFeVO_4$ or so; the transition metal sulfide such as $TiS_2$, $TiS_3$, amorphous $MoS_2$ or so; the transition metal oxide such as $Cu_2V_2O_3$, amorphous $V_2O$—$P_2O_5$, $MoO_3$, $V_2O_5$, $V_6O_{13}$ or so may be mentioned. These compounds may be partially substituted with other elements.

As for the positive electrode active material made from the organic compound, for example, polyaniline, polypyrrole, polyacene, disulfide based compound, polysulfide based compound, N-fluoropyridinium salts or so may be mentioned.

Note that, the positive electrode active material may be a mixture of above mentioned inorganic compound and the organic compound.

As for the negative electrode active material, the allotrope of carbon such as graphite or the cokes or so may be mentioned. The negative electrode active material made from the allotrope of said carbons may be used in the form of a coated body or the mixtures with such as metal, metal salts, and oxides or so. Also, as the negative electrode active material, the oxides or sulfates of silicon, tin, zinc, manganese, ferrous, nickel or so; lithium alloy such as lithium metal, Li—Al, Li—Bi—Cd, Li—Sn—Cd or so; lithium transition metal nitrides, silicon or so can be used.

The average particle diameter of the electrode active material is usually 1 to 50 μm and preferably 15 to 30 μm in terms of volume average particle diameter from the point of improving the battery characteristic such as the load characteristic, the cycle characteristic or so. By having the average particle diameter of the electrode active material within the above mentioned range, the all solid-state secondary battery having large charge discharge capacity can be obtained, and the electrode slurry used for forming the electrode material mixture layer becomes easy to handle, further it is easy to handle when producing the electrode. The average particle diameter of the electrode active material can be obtained by measuring the particle size distribution using the laser diffraction.

The weight ratio between the electrode active material and the inorganic solid electrolytes in the electrode material mixture layer (the electrode active material: the inorganic solid electrolytes) is preferably 90:10 to 30:70, more preferably 80:20 to 40:60. In case the weight ratio of the electrode active material is smaller than the above mentioned range, the electrode active material amount in the battery decreases, thus it may lead to the capacity decline of the battery. Also, if the weight ratio of the inorganic solid electrolytes is smaller than the above mentioned range, sufficient conductivity cannot be obtained, thus the electrode active material cannot be efficiently used, which may lead to the capacity decline of the battery.

The electrode material mixture layer can be added with other components depending on the needs besides the above mentioned component. As other component, additives which exhibit various functions such as a lithium salt, a disperser, a leveling agent, a antifoaming agent, a conductive agent, a reinforcing material or so may be mentioned. These are not particularly limited as long as it does not interfere with the battery reaction.

Lithium Salt

The lithium salt is made by $Li^+$ cation, and anion such as $Cl^-$, $Br^-$, $BF_4^-$, $PF_6^-$, $AsF_6^-$, $ClO_4^-$, $CF_3SO_3^-$, $SCN^-$ or so; and for example, lithium perchlorate, lithium tetrafluoroborate, lithium hexafluorophosphate, lithium trifluoroacetate, lithium trifluoromethane sulfonate or so may be mentioned. As the weight ratio between the binder and the lithium salt of the electrode material mixture layer, preferably 0.5 to 30 parts by weight, more preferably 3 to 25 parts by weight of the lithium salt is included with respect to 100 parts by weight of binder. By having the weight ratio between the binder and the lithium salt within the above mentioned range, the ion conductivity can be improved.

Disperser

As the disperser, an anionic compound, a cationic compound, a non-ionic compound, a polymer compound may be mentioned. The disperser is selected depending on the inorganic solid electrolytes being used. The content of the disperser in the electrode material mixture layer is within the range which does not interfere the battery characteristic and specifically it is 10 parts by weight or less with respect to 100 parts by of the inorganic solid electrolytes.

Leveling Agent

As for the leveling agent, the surfactants such as the alkyl based surfactant, the silicone based surfactant, fluorine based surfactant, the metal based surfactant or so may be mentioned. By mixing the above mentioned surfactants, the repelling can be prevented which is generated when coating the electrode slurry to the surface of the conductive adhesive layer, thereby the smoothness of the electrode can be improved. The content of the leveling agent in the electrode material mixture layer is preferably within the range which does not influence the battery characteristic, and specifically it is 10 pats by weight or less with respect to 100 parts by weight of the inorganic solid electrolyte.

Antifoaming Agent

As for the antifoaming agent, a mineral oil antifoaming agent, a silicone antifoaming agent, a polymer antifoaming agent or so may be mentioned as examples. The antifoaming agent is selected in accordance with the inorganic solid electrolyte being used. The content of the antifoaming agent in the electrode material mixture layer is preferably within the range which does not influence the battery characteristic, and specifically, it is 10 parts by weight or less with respect to 100 parts by weight of the inorganic solid electrolyte.

Conductive Agent

The conductive agent is not particularly limited as long as it can give conductivity, however usually the carbon powder such as acetylene black, carbon black, graphite or so, and fibers and foils of various metals may be mentioned.

The content of the conductive agent in the electrode material mixture layer is preferably 0.1 to 20 parts by weight, more preferably 0.5 to 15 parts by weight, and particularly preferably 1 to 13 parts by weight with respect to 100 parts by weight of electrode active material. By making the content of the conductive agent within the above mentioned range, sufficient electron conductivity can be provided to the electrode material mixture while maintaining high battery capacity.

Reinforcing Material

As for the reinforcing material, the filler having a spherical shape, a plate shape, a rod shape, or a fibrous shape of various organic and inorganic materials can be used.

The content of the reinforcing material in the electrode material mixture layer is preferably 0.1 to 20 parts by weight, more preferably 0.5 to 5 parts by weight, and particularly preferably 1 to 3 parts by weight with respect to 100 parts by weight of the electrode active material. By having the content of the reinforcing material within the above mentioned range, a sufficient strength can be provided to the electrode material mixture layer while maintaining high battery capacity.

The thickness of the electrode material mixture layer is not particularly limited; however it is preferably 10 to 200 μm, and more preferably 30 to 180 μm.

(The Crosslinked Structure)

The crosslinked structure in the present invention is formed by crosslinking the carbon-carbon double bond of the diene based polymer comprised in the aforementioned conductive adhesive agent layer with the sulfur atom comprised in the electrode material mixture layer.

Said crosslinked structure can be formed by forming the conductive adhesive agent layer on the current collector, and forming the electrode material mixture layer thereon by desired method. By forming said crosslinked structure, the conductive adhesive agent layer and the electrode material mixture layer can be strongly bound. In this case, the electrode material mixture layer is formed on the surface of the conductive adhesive agent layer, and then the crosslinking reaction may be carried out.

Also, depending on the shape and the size or so of the crosslinked structure, it may not be crosslinked sufficiently in the inside even if the surface is crosslinked, thus in such case a secondary crosslinking may be carried out by heating.

As the method of said heating, the heating generally used for the crosslinking of the rubber may be suitably chosen such as a press heating, steam heating, an oven heating, a hot air heating or so.

The crosslinked structure in the present invention obtained as such has excellent mechanical characteristic since it is obtained by crosslinking the aforementioned sulfur atom and the carbon-carbon double bond of the diene based polymer.

The gel fraction of the diene based polymer after forming the crosslinked structure between the sulfur atom included in the inorganic solid electrolyte and the carbon-carbon double bond of the diene based polymer (after the crosslinked reaction) is preferably 70 to 95%, more preferably 72 to 95%, and more preferably 75 to 95%. By having the gel fraction of the diene based polymer after the crosslinking reaction within the above mentioned range, the electrode for all solid-state secondary battery having excellent peel strength can be obtained.

The gel fraction of the diene based polymer after the crosslinking reaction can be measured by the below described method. Also, according to the gel fraction of the diene based polymer before and after the crosslinking structure, the presence of the crosslinked structure formed between the sulfur atom included in the inorganic solid electrolyte and the carbon-carbon double bond of the diene based polymer can be verified.

<The Production Method of the Electrode for the all-Solid State Secondary Battery>

The production method of the electrode for the all solid-state secondary battery is not particularly limited; however it is preferable to include (1) a step of forming a conductive adhesive agent layer including the conductive particle and the conductive adhesive agent layer binder comprising the diene based polymer comprising the carbon-carbon double bond on the current collector, (2) a step of coating the electrode slurry including binder, the inorganic solid electrolyte including the sulfur atom and the electrode active material on said conductive adhesive agent layer, and (3) a step of drying said coated electrode slurry; wherein said drying step preferably includes (3-1) a step of drying at 25 to 90° C., and (3-2) a step at drying at 100 to 200° C.

<Step (1)>

As for the method of forming the conductive adhesive agent layer on the current collector, for example; a method of coating the slurry for the conductive adhesive agent layer on the current collector, and then drying; or a method of coating the slurry for the conductive adhesive agent layer on the carrier film then drying followed by transferring on to the current collector or so may be mentioned. Note that, the carrier film is not particularly limited. Also, the method of transferring the conductive adhesive agent layer formed on the carrier film is not particularly limited.

The slurry for the conductive adhesive agent layer can be obtained by dispersing or dissolving the above mentioned components constituting the conductive adhesive agent layer into solvent. As for the solvent, any of water and organic solvent or so can be used. As the organic solvent, alicyclic hydrocarbons such as cyclopentane, cyclohexane or so; aromatic hydrocarbons such as toluene, xylene, ethylbenzene or so; ketones such as acetone, ethylmethyl ketone, diisopropyl ketone, cyclohexanone, methylcyclohexane, ethylcyclohexane or so; chlorine based aliphatic hydrocarbons such as methylene chloride, chloroform, tetrachloride carbon or so; esters such as ethyl acetate, butyl acetate, γ-butylolactone, ε-caprolactone or so; acylonitriles such as acetonitrile, propionitrile or so; ethers such as tetrahydrofurane, ethyleneglycoldiethylether or so; alcohols such as methanol, ethanol, isopropanol, ethylene glycol, ethylene glycolmonomethylether or so; amides such as N-methylpyrrolidone, N,N-dimethyl formamide or so may be mentioned.

These solvents may be used alone or by combining two or more thereof. Among these, the solvent having excellent dispersibility of the conductive particle, low boiling point and high volatility is preferable as it can be removed in a short period of time under low temperature. Specifically, acetone, toluene, cyclohexanone, cyclopentane, tetrahydrofurane, cyclohexane, xylene, water, or N-methylpyrrolidone, or the mixed solvent thereof is preferable.

The amount of the solvent used when preparing the slurry for the conductive adhesive agent layer is usually 1 to 50 wt %, preferably 5 to 50 wt %, and more preferably 10 to 30 wt % in terms of solid portion concentration of the slurry. When the amount of the solvent is within this range, the adhesive agent layer binder in the slurry for the conductive adhesive agent layer tends to be easily dispersed in uniform manner. Also, when the amount of the solvent is within this range, the dispersibility of the conductive particle in the slurry for the conductive adhesive agent layer improves, and also the coating property or the drying property of the slurry for the conductive adhesive agent layer improves.

The method or the order of dispersing or dissolving the above mentioned components constituting the conductive adhesive agent layer is not particularly limited; and for example the method of adding the conductive particle, the adhesive agent layer binder or other components then mixing; the method of adding and mixing the conductive adhesive agent layer binder (for example, latex) dispersed in the solvent after the resin component is dissolved in the solvent, then finally adding and mixing the conductive particle or other components; the method of adding and mixing the conductive particle to the resin component being dissolved in the solvent, then adding and mixing thereto the adhesive agent layer binder dispersed in the solvent or so may be mentioned. As the means for mixing, for example, a ball mill, a sand mill, a pigment dispersing machine, a grinder, an ultrasonic dispersion machine, a homogenizer, a planetary mixer or so may be mentioned. The mixing is usually done at room temperature to 80° C., for 10 minutes to several hours.

The viscosity of the slurry for the conductive adhesive agent is preferably 5 to 500 mPa·s, more preferably 10 to 400 mPa·s, and particularly preferably 15 to 300 mPa·s. When the viscosity of the slurry for the conductive adhesive agent layer is within the above mentioned range, the dispersibility and the coating property of said slurry becomes good.

Note that, the viscosity of slurry was measured according to JIS Z8803:2011, using the single rotating cylinder viscometer (RB80L made by TOKI SANGYO CO., LTD.)(25° C., rotating speed: 6 rpm, rotor shape: No. 1 (the viscosity 1000 mPa·s or less), No. 2 (the viscosity 1000 to 5000 mPa·s), No. 3 (the viscosity 5000 to 20000 mPa·s), No. 4 (the viscosity 20,000 to 100,000 mPa·s)), the viscosity at one minute after starting of the measurement was measured and this was set as the slurry viscosity. The viscosity of the electrode slurry and the slurry for the solid electrolyte layer which will be described in below were also measured by the above mentioned method.

The method of coating the slurry for the conductive adhesive agent layer to the current collector or to the carrier film is not particularly limited, and for example, it may be coated by a doctor blade method, a dip method, a reverse roll method, a direct roll method, a gravure method, an extrusion method or a brush method or so. The amount being coated is not particularly limited, and it is an amount that the thickness of the conductive adhesive agent layer formed after the solvent has been removed is preferably 0.1 to 5 μm, more preferably 0.5 to 2 μm or so. The drying method is also not particularly limited, and for example the drying by a warm air, a hot air, a low moisture air, a vacuum drying, a drying by an irradiation of (far) infrared ray or electron beam or so may be mentioned. The drying condition is controlled so that the organic solvent evaporates as fast as possible within the range so that the crack is not generated to the conductive adhesive agent layer due to the focused stress or the conductive adhesive agent layer does not release from the current collector.

The drying temperature is a temperature that the organic solvent sufficiently evaporates. Specifically, 50 to 250° C. is preferable, and 80 to 200° C. is further preferable. By setting within said range, the conductive adhesive agent layer can be formed in good condition without having thermal decomposition of the adhesive agent layer binder. The drying time is not particularly limited, and usually it is 10 to 60 minutes.
<Step (2)>

The electrode slurry can be obtained by dispersing or dissolving the above mentioned components constituting the electrode material mixture layer to the solvent. As for the solvent, the same solvent mentioned in the solvent used for the production of the slurry for the conductive adhesive agent layer may be mentioned. Also, as the method and the order of dispersing or dissolving the above mentioned component constituting the electrode material mixture layer, the same method and the order described in slurry for the conductive adhesive agent layer of step (1) may be mentioned.

The amount of the solvent used when preparing the electrode slurry is usually 40 to 90 wt %, preferably 45 to 85%, and more preferably 50 to 80 wt % in terms of the solid portion concentration of the electrode slurry. When the amount of the solvent is within this range, the binder disperses uniformly.

The viscosity of the electrode slurry is preferably 3000 to 50000 mPa·s, more preferably 4000 to 30000 mPa·s, and particularly preferably 5000 to 10000 mPa·s. By having the viscosity of the electrode slurry within the above mentioned range, the dispersibility and the coating property of the electrode slurry becomes good. If the viscosity of the electrode slurry is less than 3000 mPa·s, then the electrode active material and the inorganic solid electrolyte in the electrode slurry may precipitate. Also, if the viscosity of the electrode slurry exceeds 50000 mPa·s, then uniformity of the coating may be lost.

The method for coating the electrode slurry to the conductive adhesive agent layer is not particularly limited; and as an example the same coating method described in the slurry for the conductive adhesive agent layer in above mentioned step (1) may be mentioned. The amount being coated is not particularly limited, and it is an amount that the thickness of the electrode material mixture layer formed after the removal of the solvent is preferably 10 to 200 μm, more preferably 30 to 180 μm or so.
<Step (3)>

Step (3) of drying the electrode slurry being coated in the above mentioned step (2) includes step (3-1) of drying at 25 to 90° C., and step (3-2) of drying at 100 to 200° C.

The method of drying is not particularly limited, and as similar to the step (1), for example, the drying by warm air, hot air, low humidified air, and a vacuum drying, a drying by irradiating (far) infrared rays or electron beam or so may be mentioned. The drying condition is usually regulated so that the solvent evaporates speedily, within the range that the crack into the electrode material mixture layer caused by the stress concentration or the release of the electrode material mixture layer from the current collector does not occur.

The drying temperature of the step (3-1) is usually 25 to 90° C., preferably 30 to 90° C., and more preferably 40 to 80° C. Also the drying temperature of the step (3-2) is usually 100 to 200° C., preferably 105 to 190° C., and more preferably 110 to 180° C. By carrying out in two steps as mentioned in above for drying the electrode slurry coated by the above mentioned step (2), the binder in the electrode material mixture layer can be prevented from segregating, thus the internal resistance of the electrode can be made smaller.

Within the drying temperature range of the step (3-1), the crosslinking reaction between the aforementioned carbon-carbon double bond and the sulfur atom does not take place, however the crosslinking reaction between said sulfur atom and said carbon-carbon double bond of the diene based polymer can be carried out efficiently during the step (3-2) while suppressing the segregation of the binder in the electrode material mixture.

The drying time is not particularly limited, however the drying time for step (3-1) is usually 1 to 600 seconds, preferably 3 to 400 seconds, more preferably 5 to 300 seconds; and the time for step (3-2) is usually 1 to 600 seconds, preferably 3 to 400 seconds, and more preferably 5 to 300 seconds.

Also, the electrode for the all solid-state secondary battery produced by the above mentioned steps (1) to (3) may be further pressed. As the method of pressing, metal mold pressing, or calendar pressing or so may be mentioned; however it is not particularly limited.

<The all Solid-State Secondary Battery>

The all solid-state secondary battery of the present invention comprises the positive electrode, the solid electrolyte layer and the negative electrode, and at least one of the positive electrode or the negative electrode is the electrode for the all solid-state secondary battery of the present invention. As at least one of the positive electrode or the negative electrode is the electrode for the all solid-state secondary battery of the present invention, the all solid-state secondary battery having excellent high temperature cycle characteristic can be obtained.

(The Solid Electrolytes Layer)

The solid electrolyte layer of the present invention includes the above mentioned inorganic solid electrolyte and the binder. The solid electrolyte layer is formed by the method coating and drying the slurry for the solid electrolyte layer including the inorganic solid electrolyte and the binder on the electrode material mixture layer of the electrode for the all solid-state secondary battery; or the method of coating and drying the slurry for the solid electrolyte layer onto the carrier film then transferring onto the electrode material mixture layer of the electrode for the all solid-state secondary battery.

The slurry for the solid electrolyte layer can be obtained by dispersing or dissolving the inorganic solid electrolyte, the binder and other components, added depending on the needs in the solvent. The solvent may be the same as the solvent which has been described in the slurry for the conductive adhesive agent layer. Also, as for the method and the order of dispersing or dissolving the components constituting the solid electrolyte layer to the solvent, the same method which has been described in the slurry for the conductive adhesive agent layer of aforementioned step (1) may be mentioned.

The amount of the solvent used for preparing the slurry for the solid electrolyte layer is usually 1 to 50 wt %, preferably 5 to 50 wt %, and more preferably 10 to 30 wt % in terms of the solid portion concentration of the slurry for the solid electrolyte layer. When the amount of the solvent is within this range, the binder disperses uniformly.

The viscosity of the slurry for the solid electrolyte layer produced as mentioned in the above is preferably 10 to 500 mPa·s, more preferably 15 to 400 mPa·s, and particularly preferably 20 to 300 mPa·s. By having the viscosity of the slurry for the solid electrolyte layer, the dispersity and the coating property of said slurry becomes good. If the viscosity of the slurry for the solid electrolyte layer is less than 10 mPa·s, the slurry may drip. Also, if the viscosity of the slurry for the solid electrolyte layer exceeds 500 mPa·s, then it may become difficult to form a thin solid electrolyte layer.

The method for coating the slurry for the solid electrolyte layer to the electrode material mixture layer or the carrier film is not particularly limited; and the same coating method described in the slurry for the conductive adhesive agent layer of the aforementioned step (1) may be mentioned, however the gravure method is preferable as thin solid electrolyte layer can be formed. The amount of coating is also not limited, however it is the amount that the thickness of the solid electrolyte layer formed after removing the solvent preferably of 1 to 50 μm, and more preferably 3 to 30 μm or so. By having the thickness of the solid electrolyte layer within the above mentioned range, the internal resistance of the all solid-state secondary battery can be made small. As for the drying method, the drying condition and the drying temperature, the same drying method, the same drying condition and the same drying temperature range as described in the slurry for the conductive adhesive agent layer may be mentioned.

In case of directly coating the slurry for the solid electrolyte layer to the electrode material mixture layer, it is not particularly limited as to which of the positive electrode mixture layer or the negative electrode mixture layer should the slurry for the solid electrolyte layer be coated; however, it is preferable to coat the slurry for the solid electrolyte layer to the electrode material mixture layer having larger particle diameter of the electrode active material. If the average particle diameter of the electrode active material is large, a roughness tends to be easily formed on the electrode material mixture layer surface, thus by coating the slurry for the solid electrolyte layer thereon, the roughness formed on the electrode material mixture layer surface can be relieved. Thereby, when stacking the electrode formed with the solid electrolyte layer and the electrode without the solid electrolyte layer via the solid electrolyte layer, the contact area between the solid electrolyte layer and the electrode becomes large, hence the boundary resistance can be suppressed.

The positive electrode and/or the negative electrode of the all solid-state secondary battery of the present invention is produced by the production method of the electrode for the all solid-state secondary battery of the present invention. Then, the solid electrolyte layer is formed on the electrode material mixture layer of at least one of the electrode (the positive electrode or the negative electrode). Next, by adhering other electrode (the positive electrode or the negative electrode) without the solid electrolyte layer and the electrode formed with the above mentioned solid electrolyte layer via the solid electrolyte layer, the all solid-state secondary battery element can be obtained.

The thickness of the solid electrolyte layer is not particularly limited; however it is preferably 1 to 50 μm, more preferably 3 to 30 μm.

In the present invention, the above mentioned all-solid state secondary battery element may be applied with a pressure. The pressure applying method is not particularly limited; however for example a flat plate press, a roll press, a CIP (Cold Isostatic Press) or so may be mentioned. As for the pressure for pressure pressing, it is preferably 5 to 700 MPa, more preferably 7 to 500 MPa. By having the pressure within the above range, the resistance at each boundary between the electrode and the solid electrolyte layer can be made low, and further the contact resistance between the particles in each layer can be made low, thereby a good battery characteristic can be exhibited.

The all solid-state secondary battery can be obtained by placing the obtained all solid-state secondary battery element in its shape as it is or by rolling or bending depending on the shape of the battery and then by sealing. Also, if needed, an expand metal, an electrical fuse, an overcurrent prevention element such as a PTC element or so, and lead plate or so may be placed in the battery container thereby the pressure rising inside the battery and the excessive charge discharge can be prevented. The shape of the battery can be any one of a coin shape, a button shape, a sheet shape, a tubular shape, a square shape, a flat shape or so.

EXAMPLES

Hereinafter, the present invention will be explained based on the examples; however the present invention is not to be limited thereto. Each characteristic are evaluated based on the following method. Note that. "parts" and "%" in the present examples are "parts by weight" and "wt %" respectively unless mentioned otherwise.

<The Gel Fraction>
(Before the Crosslinking Reaction)

Using the solid high resolution NMR device and based on the spectrum of $^{13}C$-NMR method, the crosslinking amount was calculated from the ratio (=integrated value B/(integrated value A+integrated value B)×100) which is the ratio between an integrated values of signal of C, signal of CH, signal of $CH_2$, a signal of $CH_3$ (integrated value of A) of after the production of adhesive agent layer binder, and integrated values of signal of C, signal of CH, signal of $CH_2$, a signal of $CH_3$ (integrated value of B) which appears at 10 to 70 ppm due to the crosslink between the carbon-carbon double bond of the adhesive agent layer binder after the adhesive agent layer formation. Thereby, the gel fraction of the adhesive agent layer binder before the crosslinking reaction was obtained.

(After the Crosslinking Reaction)

After the production of the electrode for the all solid-state secondary battery, the electrode material mixture layer and the conductive adhesive agent layer were released. The released electrode material mixture layer and the conductive adhesive agent layer were pulverized or cut into small pieces having the particle diameter or the length of 0.001 to 0.5 mm or so using a freeze crusher, a scissors or a knife or so. The above mentioned small pieces were carried out with an acetone extraction, then the by-products such as the metal salts or so derived from additives of zinc oxide or vulcanization accelerator and fatty acids or so were filtered, and removed. Then, acetone was removed by vacuum drying device or so, and dried thereby the solid sample (the adhesive agent layer binder) was obtained.

Using the solid high resolution NMR device and based on the spectrum of $^{13}C$-NMR method, the crosslinking amount was calculated from the ratio (=(integrated value B+integrated value D)/(integrated value B+integrated value C+integrated value D)×100) which is the ratio between, integrated values of signal of C, signal of CH, signal of $CH_2$, signal of $CH_3$ (integrated value of B) which appears at 10 to 70 ppm due to the crosslink between the carbon-carbon double bond of the adhesive agent layer binder after the adhesive agent layer formation; integrated values of signal of C, signal of CH, signal of $CH_2$, a signal of $CH_3$ (integrated value of C) of the solid samples; integrated values of signal of C, signal of CH, signal of $CH_2$, a signal of $CH_3$ (integrated value of D) which appears at 10 to 70 ppm by being crosslinked by sulfur. Thereby, the gel fraction of the adhesive agent layer binder after the crosslinking reaction was obtained.

Also, based on the change of the integrated value of said signals also before and after the crosslinking reaction, the presence of the crosslinked structure was verified.

<The Peel Strength>

The binding property between the conductive adhesive agent layer and the positive electrode active material layer were evaluated as described in the following.

The positive electrode formed with the positive electrode active material layer was cut in a rectangular shape having the size of the width 1.0 cm×the length 10 cm to form a test piece. Then, it was fixed by facing the positive electrode active material layer face up. After pasting the cellophane tape on the positive electrode active material layer surface of the test piece, the stress when peeling the cellophane tape from one end of the test piece to 180° direction at the speed of 50 mm/min was measured. The measurement was carried out for 10 times, and the peel strength (N/m) was determined from the average thereof, and was evaluated in the below standard. The larger the peel strength is, the more excellent the binding property of the positive electrode active material layer is.

A: 50 N/m or more
B: 40 N/m or more and less than 50 N/m
C: 30 N/m or more and less than 40 N/m
D: 20 N/m or more and less than 30 N/m
E: less than 20 N/m <The Battery Characteristic: The High Temperature Cycle Characteristic>

For 10 cells of all solid-state secondary battery, under the atmosphere of 60° C., it was charged to 4.2 V by the constant current method of 0.1 C, then it was discharged to 3.0 V at 0.1 C thereby the discharge capacity "a" was obtained. Then, it was charged to 4.2 V at 0.1 C, and discharged to 3.0 V at 0.1 C. This was repeated for 50 cycles; thereby the discharge capacity "b" at $50^{th}$ cycle was obtained. The average value of 10 cells was defined as the measured value; and the capacity maintaining ratio at the high temperature cycle was calculated (the high temperature capacity maintaining ratio). The higher the capacity maintaining ratio is, the more excellent the high temperature characteristic of the all solid-state secondary battery is.

The high temperature cycle characteristic maintaining ratio (%)=the average value of the discharge capacity "b" of $50^{th}$ cycle/the average value of the discharge capacity "a" of $1^{st}$ cycle×100

A: 90% or more
B: 80% or more and less than 90%
C: 70% or more and less than 80%
D: 60% or more and less than 70%
E: less than 60%

Example 1

The Preparation of the Diene Based Polymer A

To the reaction chamber having the stirrer device sufficiently substituted by nitrogen, 550 parts of dehydrated cyclohexane, 50 parts of dehydrated styrene, 50 parts of dehydrated butadiene, 0.475 parts of n-dibutylether were introduced, and 0.68 parts of n-butyllithium (15% cyclohexane solution) were added while stirring at 60° C., thereby the polymerization was initiated. After carrying out the reaction for 60 minutes at 60° C. while stirring, the above mentioned solution was filtered by the filter made of metal fiber (the pore diameter of 0.4 μm, made by NICHIDAI CO., LTD) to remove the fine solid portion. Then, by using the cylinder type condensation drying machine (product name "Kontro", made by Hitachi, Ltd), cyclohexane and other volatile components as the solvent were removed from the solution at the temperature of 260° C., and the pressure of 0.001 MPa or less. Thereby, the styrene-butadiene copolymer (hereinbelow, it may be referred as "the diene base polymer A") as the adhesive agent layer binder was obtained. Note that, the iodine value of the diene based polymer A was 235 mg/100 mg, and the content ratio of the diene based monomer unit was 50%, and the glass transition temperature was −18° C.

(The Production of the Slurry for the Conductive Adhesive Agent Layer)

100 parts of acetylene black (DENKA BLACK powder made by DENKI KAGAKU KOGYO KABUSHIKI KAISHA) having the volume average particle diameter of 0.7 nm as the carbon material, 50 parts of above mentioned diene based polymer A, 850 parts of xylene, 0.2 parts of N-cyclohexyl-2-benzothiazolesulfenamide were kneaded for 60 minutes by beads mill, thereby the slurry for the conductive adhesive agent layer was produced.

(The Formation of the Conductive Adhesive Agent Layer)

Aluminum foil (the thickness: 15 μm) was prepared as the current collector for the positive electrode. Also, copper foil (the thickness: 10 μm) was prepared as the current collector for the negative electrode. To the one side of the current collector for the positive electrode and to the one side of the current collector for the negative electrode, said slurry for the conductive adhesive agent layer was coated by the casting method using the wire bar at the casting speed of 5 m/min, then dried for 1 minute at 50° C. following 120 seconds at 130° C., thereby the conductive adhesive agent layer with a thickness of 1.2 μm was obtained.

(The Production of the Slurry for the Positive Electrode)

100 parts of lithium cobalate (the average particle diameter: 11.5 nm) as the positive electrode active material layer, 150 parts of sulfide glass ($Li_2S/P_2S_5$=70 mol %/30 mol %, the volume average particle diameter: 0.4 nm) comprising $Li_2S$ and $P_2S_5$ as the inorganic solid electrolyte, 13 parts of acetylene black as the conductive agent, and 3 parts of cyclohexane solution of butyl acrylate-styrene copolymer (copolymer ratio of butyl acrylate/styrene=70/30 (weight ratio), Tg=−2° C.) in terms of solid portion equivalent amount were mixed, then the solid portion concentration was regulated to 78% by using cyclohexane as the organic solvent, and it was mixed for 60 minutes by the planetary mixer. Further, the solid portion concentration was regulated to 74% by cyclohexane and mixed for 10 minutes; thereby the positive electrode slurry was prepared. The viscosity of the positive electrode slurry was 6100 mPa·s.

(The Production of the Negative Electrode Slurry)

100 parts of graphite (the average particle diameter: 20 μm) as the negative electrode active material, 50 parts of sulfide glass ($Li_2S/P_2S_5$=70 mol %/30 mol %, the volume average particle diameter: 0.4 μm) comprising $Li_2S$ and $P_2S_5$ as the inorganic solid electrolyte, and 3 parts of cyclohexane solution of butyl acrylate-styrene copolymer (copolymer ratio of butyl acrylate/styrene=70/30 (weight ratio), Tg=−2° C.) in terms of solid portion equivalent amount were mixed, then the solid portion concentration was regulated to 60% by adding cyclohexane as the organic solvent, then mixed by the planetary mixer thereby the negative electrode slurry was prepared. The viscosity of the negative electrode slurry was 6100 mPa·s.

(The Production of the Slurry for the Solid Electrolyte Layer)

100 parts of sulfide glass ($Li_2S/P_2S_5$=70 mol %/30 mol %, the volume average particle diameter: 1.2 nm) comprising $Li_2S$ and $P_2S_5$ as the inorganic solid electrolyte, and 3 parts of cyclohexane solution of butyl acrylate-styrene copolymer (copolymer ratio of butyl acrylate/styrene=70/30 (weight ratio), Tg=−2° C.) in terms of solid portion equivalent amount were mixed, then the solid portion concentration was regulated to 30% by using cyclohexane as the organic solvent, then mixed by the planetary mixer thereby the slurry for the solid electrolyte layer was prepared. The viscosity of the slurry for the solid electrolyte layer was 52 mPa·s.

(The Production of the Positive Electrode for the all Solid-State Secondary Battery)

The above mentioned positive electrode slurry was coated to one side of the current collector for the positive electrode (the thickness: 16.2 μm) formed with the conductive adhesive agent layer, then dried for 250 seconds at 50° C. and 250 seconds at 130° C., to form the positive electrode active material layer of 50 μm thereby the positive electrode for the all solid-state secondary battery was produced. By using this positive electrode for the all solid-state secondary battery, the gel fraction was measured, and the peel strength was evaluated. The results are shown in Table 1.

(The Production of the Negative Electrode for the all Solid-State Secondary Battery)

The above mentioned negative electrode slurry was coated to one side of the current collector for the negative electrode (the thickness: 11.2 μm) formed with the conductive adhesive agent layer, then dried for 250 seconds at 50° C. and 250 seconds at 130° C., to form the negative electrode active material layer of 30 μm thereby the negative electrode for the all solid-state secondary battery was produced.

(The Production of the all Solid-State Secondary Battery)

Next, to the surface of the positive electrode active material layer of the above mentioned positive electrode for the all solid-state secondary battery, the above mentioned the slurry for the solid electrolyte layer was coated, then dried for 180 seconds at 110° C. thereby the solid electrolyte layer having the thickness of 11 μm was formed.

The solid electrolyte layer stacked on the surface of the positive electrode active material layer, and the above mentioned negative electrode active material layer of the negative electrode were adhered via the solid electrolyte layer, then pressed, thereby the all solid-state secondary battery having the constitution of negative electrode current collector/the conductive adhesive agent layer/the negative electrode active material layer/the solid electrolyte layer/the positive electrode active material layer/the conductive adhesive agent layer/the positive electrode current collector was obtained. The thickness of the solid electrolyte layer of the all solid-state secondary battery after the pressing was 9 μm. The high temperature characteristic was evaluated using this battery. The results are shown in Table 1.

Example 2

The same slurry for the conductive adhesive agent layer as the example 1 was produced and the electrode for the all solid-state secondary battery and the all solid-state secondary battery were obtained except for using the below described diene based polymer B instead of the diene base polymer A. The results are shown in Table 1.

(The Preparation of the Diene Based Polymer B)

To the reaction chamber having the stirrer device sufficiently substituted by nitrogen, 550 parts of dehydrated cyclohexane, 50 parts of dehydrated acrylonitrile, 50 parts of dehydrated butadiene, 0.475 parts of n-dibutylether were introduced, and 0.68 parts of n-butyllithium (15% cyclohexane solution) were added while stirring at 60° C., thereby the polymerization was initiated. After carrying out the reaction for 60 minutes at 60° C. while stirring, the above mentioned solution was filtered by the filter made of metal fiber (the pore diameter of 0.4 μm, made by NICHIDAI CO., LTD) to remove the fine solid portion. Then, by using the cylinder type condensation drying machine (product name "Kontro", made by Hitachi, Ltd), cyclohexane and other volatile components as the solvent were removed from the solution at the temperature of 260° C., and the pressure of 0.001 MPa or less. Thereby, the acrylonitrile-butadiene copolymer (hereinbelow, it may be referred as "the diene base polymer B") as the adhesive agent layer binder was obtained. Note that, the iodine value of the diene based polymer B was 235 mg/100 mg, and the content ratio of the diene based monomer unit was 50%, and the glass transition temperature was −12° C.

Example 3

The same slurry for the conductive adhesive agent layer as the example 1 was produced and the electrode for the all solid-state secondary battery and the all solid-state secondary battery were obtained except for using the below described diene based polymer C instead of the diene base polymer A. The results are shown in Table 1.

(The Preparation of the Diene Based Polymer C)

To the reaction chamber having the stirrer device sufficiently substituted by nitrogen, 550 parts of dehydrated cyclohexane, 30 parts of dehydrated styrene, 70 parts of dehydrated butadiene, 0.475 parts of n-dibutylether were introduced, and 0.68 parts of n-butyllithium (15% cyclohexane solution) were added while stirring at 60° C., thereby the polymerization was initiated. After carrying out the reaction for 60 minutes at 60° C. while stirring, the above mentioned solution was filtered by the filter made of metal fiber (the pore diameter of 0.4 μm, made by NICHIDAI CO., LTD) to remove the fine solid portion. Then, by using the cylinder type condensation drying machine (product name "Kontro", made by Hitachi, Ltd), cyclohexane and other volatile components as the solvent were removed from the solution at the temperature of 260° C., and the pressure of 0.001 MPa or less. Thereby, the styrene-butadiene copolymer (hereinbelow, it may be referred as "the diene base polymer C") as the adhesive agent layer binder was obtained. Note that, the iodine value of the diene based polymer C was 328 mg/100 mg, and the content ratio of the diene based monomer unit was 70%, and the glass transition temperature was −47° C.

Example 4

The electrode for the all solid-state secondary battery and the all solid-state secondary battery were obtained as same as the example 1 except that the below described inorganic solid electrolyte was used as the inorganic solid electrolyte for the production of the electrode slurry, instead of the sulfide glass ($Li_2S/P_2S_5$=70 mol %/30 mol %, the volume average particle diameter: 0.4 μm) comprising $Li_2S$ and $P_2S_5$. The results are shown in Table 1.

(The Production of the Inorganic Solid Electrolyte)

As the starting material, lithium sulfide ($Li_2S$), phosphorous pentasulfide ($P_2S_5$), and germanium sulfide ($GeS_2$) were used. These powders were mixed in the glove box under argon atmosphere at the ratio of 0.7769 g of $Li_2S$, 0.8673 g of $P_2S_5$, and 0.3558 g of $GeS_2$; thereby the source composition was obtained. Next, the source composition was casted to a pellet form, then the obtained pellet was introduced in to the carbon coated quartz tube and vacuum sealed. The pressure of the vacuum sealed quartz tube was about 30 Pa. Next, the quartz tube was placed in the firing furnace, and the temperature was raised to 700° C. from the room temperature taking 6 hours, then 700° C. was maintained for 8 hours, and it was slowly cooled to the room temperature. Thereby, the amorphous ion conductive material having the composition of $Li_{3.25}Ge_{0.25}P_{0.75}S_4$ was obtained. Note that, the above mentioned composition corresponds to $Li_{(4-x)}Ge_{(1-x)}P_xS_4$ wherein x=0.75.

Next, the obtained ion conductive material was pulverized using the vibration mill. As the vibration mil, high speed vibration sample mill "TI-100" made by CMT co., ltd was used. Specifically, about 2 g of above obtained ion conductive material, and aluminum vibrator (φ 36.3 mm, height 48.9 mm) were introduced in 10 ml pot, and the treatment was carried out for 30 minutes at the rotation speed of 1440 rpm. Then, the ion conductive material with lowered crystallinity was casted into a pellet form; and the obtained pellet was introduced into the carbon coated quartz tube then it was vacuum sealed. The pressure of the vacuum sealed quartz tube was about 30 Pa. Then, the quartz tube was placed in the firing furnace and the temperature was raised to 550° C. from the room temperature taking 6 hours, then 550° C. was maintained for 8 hours, then it was slowly cooled to room temperature. Thereby, the amorphous inorganic solid electrolyte having the composition of $Li_{3.25}Ge_{0.25}P_{0.75}S_4$ was obtained.

Example 5

The electrode for the all solid-state secondary battery and the all solid-state secondary battery were obtained as same as the example 1, except that during the production of the electrode (the positive electrode and the negative electrode) for the all solid-state secondary battery, the electrode slurry was dried for 250 seconds at 130° C. instead of drying for 250 seconds at 50° C. and 250 seconds at 130° C., then the evaluations were carried out. The results are shown in Table 1.

Example 6

The electrode for the all solid-state secondary battery and the all solid-state secondary battery were obtained as same as the example 1, except that the below described slurry for the conductive adhesive agent layer was used instead of the slurry for the conductive adhesive agent layer, then the evaluation was carried out. The results are shown in Table 1.

(The Production of the Slurry for the Conductive Adhesive Agent Layer)

100 parts of acetylene black (DENKA BLACK powder made by DENKI KAGAKU KOGYO KABUSHIKI KAISHA) having the volume average particle diameter of 0.7 nm as the carbon material, 50 parts of the above mentioned diene based polymer A, 850 parts of xylene were kneaded for 60 minutes by the beads mill thereby the slurry for the conductive adhesive agent was produced.

Example 7

The same slurry for the conductive adhesive agent layer as the example 1 was produced and the electrode for the all solid-state secondary battery and the all solid-state secondary battery were obtained except for using the below described diene based polymer D instead of the diene based polymer A, and not adding N-cyclohexyl-2-benzothiazole-sulfenamide, and the evaluations were carried out. The results are shown in Table 1.

(The Preparation of the Diene Based Polymer D)

To the reaction chamber having the stirrer device sufficiently substituted by nitrogen, 550 parts of dehydrated cyclohexane, 25 parts of dehydrated acrylonitrile, 75 parts of dehydrated butadiene, 0.475 parts of n-dibutylether were introduced, and 0.68 parts of n-butyllithium (15% cyclohexane solution) were added while stirring at 60° C., thereby the polymerization was initiated. After carrying out the reaction for 60 minutes at 60° C. while stirring, the above mentioned solution was filtered by the filter made of metal fiber (the pore diameter of 0.4 μm, made by NICHIDAI CO., LTD) to remove the fine solid portion. Then, by using the cylinder type condensation drying machine (product name "Kontro", made by Hitachi, Ltd), cyclohexane and other volatile components as the solvent were removed from the solution at the temperature of 260° C., and the pressure of 0.001 MPa or less. Thereby, the acrylonitrile-butadiene copolymer as the adhesive agent layer binder was obtained.

Next, the above mentioned copolymer was transferred to the pressure resistant chamber with the stirrer, 3.0 parts of silica-alumina carrying type nickel catalyst (product name "T-8400RL", made by Clariant Catalyst (Japan) K.K.) as the hydrogenated gas catalyst, and 100 parts of dehydrated cyclohexane were added and mixed. The reaction chamber was substituted by hydrogen gas, and hydrogen was supplied while further stirring, then hydrogenation reaction was carried out at the temperature of 170° C. under the pressure of 4.5 MPa thereby the hydrogenated acrylonitrile-butadiene copolymer (hereinafter, it may be referred as "the diene based polymer D") was obtained. Note that, the iodine value of the diene based polymer D was 20 mg/100 mg, and the content ratio of the diene based monomer unit was 75%, and the glass transition temperature was −35° C.

Comparative Example 1

The same slurry for the conductive adhesive agent layer as the example 1 was produced and the electrode for the all solid-state secondary battery and the all solid-state secondary battery were obtained except for using chitosan instead of the diene based polymer A, and the evaluation was carried out. The results are shown in Table 1. Note that, the iodine value of chitosan was 0 mg/100 mg.

Comparative Example 2

The same slurry for the conductive adhesive agent layer as the example 1 was produced and the electrode for the all solid-state secondary battery and the all solid-state secondary battery were obtained except for using the below described diene based polymer E instead of the diene based polymer A, and the evaluation was carried out. The results are shown in Table 1.

(The Preparation of the Diene Based Polymer E)

To the reaction chamber having the stirrer device sufficiently substituted by nitrogen, 550 parts of dehydrated cyclohexane, 20 parts of dehydrated styrene, 80 parts of dehydrated butadiene, 0.475 parts of n-dibutylether were introduced, and 0.68 parts of n-butyllithium (15% cyclohexane solution) were added while stirring at 60° C., thereby the polymerization was initiated. After carrying out the reaction for 60 minutes at 60° C. while stirring, the above mentioned solution was filtered by the filter made of metal fiber (the pore diameter of 0.4 μm, made by NICHIDAI CO., LTD) to remove the fine solid portion. Then, by using the cylinder type condensation drying machine (product name "Kontro", made by Hitachi, Ltd), cyclohexane and other volatile components as the solvent were removed from the solution at the temperature of 260° C., and the pressure of 0.001 MPa or less. Thereby, the styrene-butadiene copolymer (hereinbelow, it may be referred as "the diene base polymer E") as the adhesive agent layer binder was obtained. Note that, the iodine value of the diene based polymer E was 375 mg/100 mg, and the content ratio of the diene based monomer unit was 80%, and the glass transition temperature was −60° C.

Comparative Example 3

The electrode for the all solid-state secondary battery and the all solid-state secondary battery were obtained as same as the example 1 except that $Li_3PO_4$ (the average particle diameter: 10 μm, made by Sigma-Aldrich Co. LLC.) was used as the inorganic solid electrolyte used in the production of the electrode slurry, instead of the sulfide glass ($Li_2S$/$P_2S_5$=70 mol %/30 mol %, the volume average particle diameter: 0.4 μm) comprising $Li_2S$ and $P_2S_5$. The results are shown in Table 1.

TABLE 1

| | | Example 1 | Example 2 | Example 3 | Example 4 | Example 5 | Example 6 |
|---|---|---|---|---|---|---|---|
| Adhesive agent layer binder | Type | SBR | NBR | SBR | SBR | SBR | SBR |
| | Content ratio (%) of diene based monomer unit | 50 | 50 | 70 | 50 | 50 | 50 |
| | Iodine value (mg/100 mg) | 235 | 235 | 328 | 235 | 235 | 235 |
| | Tg (° C.) | −18 | −12 | −47 | −18 | −18 | −18 |
| Inorganic solid electrolyte | | $Li_2S$/$P_2S_5$ | ← | ← | $Li_{3.25}Ge_{0.25}P_{0.75}S_4$ | $Li_2S$/$P_2S_5$ | ← |
| Vulcanization accelerator | | N-cyclohexyl-2-benzothiazole | ← | ← | ← | ← | None |
| Drying temperature of electrode slurry | | (i) 50° C. (ii) 130° C. | (i) 50° C. (ii) 130° C. | (i) 50° C. (ii) 130° C. | (i) 50° C. (ii) 130° C. | (i) 130° C. | (i) 50° C. (ii) 130° C. |
| Gel fraction (%) | Before crosslinking reaction | 51 | 60 | 62 | 50 | 50 | 51 |

TABLE 1-continued

|  |  |  |  |  |  |  |
|---|---|---|---|---|---|---|
| After crosslinking reaction | 88 | 90 | 90 | 87 | 87 | 70 |
| Presence of crosslinking structure | Present | Present | Present | Present | Present | Present |
| Peel strength (N/m) | 55 | 52 | 41 | 51 | 45 | 42 |
| Evaluation | A | A | B | A | B | B |
| High temperature cycle characteristic Capacity maintaining ratio (%) | 91 | 90 | 83 | 89 | 79 | 76 |
| Evaluation | A | A | B | B | C | C |

|  |  | Example 7 | Comparative example 1 | Comparative example 2 | Comparative example 3 |
|---|---|---|---|---|---|
| Adhesive agent layer binder | Type | NBR | chitosan | SBR | SBR |
|  | Content ratio (%) of diene based monomer unit | 75 | — | 80 | 50 |
|  | Iodine value (mg/100 mg) | 20 | 0 | 375 | 235 |
|  | Tg (° C.) | −35 | — | −60 | −18 |
| Inorganic solid electrolyte |  | ← | ← | ← | Li$_3$PO$_4$ |
| Vulcanization accelerator |  | None | N-cyclohexyl-2 benzothiazole | ← | ← |
| Drying temperature of electrode slurry |  | (i) 50° C. (ii) 130° C. | (i) 50° C. (ii) 130° C. | (i) 50° C. (ii) 130° C. | (i) 50° C. (ii) 130° C. |
| Gel fraction (%) | Before crosslinking reaction | 68 | 0 | 65 | 0 |
|  | After crosslinking reaction | 73 | 0 | 80 | 0 |
| Presence of crosslinking structure |  | Present | None | Present | None |
| Peel strength | (N/m) | 40 | 35 | 42 | 39 |
|  | Evaluation | C | C | B | C |
| High temperature cycle characteristic | Capacity maintaining ratio (%) | 77 | 65 | 60 | 66 |
|  | Evaluation | C | D | D | D |

According to Table 1, the electrode for the all solid-state secondary battery of the examples 1 to 7 has excellent balance between the peel strength and the high temperature characteristic compared to that of the comparative examples 1 to 3. Particularly, the all solid-state secondary batteries of the examples 1 to 6 have excellent peel strength and the high temperature characteristic compared to the batteries of the comparative examples 1 to 3.

The invention claimed is:

1. An electrode for an all solid-state secondary battery comprising a current collector, a conductive adhesive agent layer and an electrode material mixture layer, wherein
said electrode material mixture layer includes a binder, an inorganic solid electrolyte having sulfur atom, and an electrode active material,
said conductive adhesive agent layer includes a conductive particle, and an adhesive agent binder comprising a diene based polymer,
said diene based polymer has 10 to 75 wt % of diene based monomer units and an iodine value is 5 to 350 mg/100 mg; and
the sulfur atom included in said inorganic solid electrolyte and a carbon-carbon double bond of said diene based polymer are crosslinked.

2. The electrode for the all solid-state secondary battery as set forth in claim 1, wherein said diene based polymer is one or two or more selected from the group consisting of styrene-butadiene copolymer, styrene-isoprene copolymer, isobutylene-isoprene copolymer, ethylene-propylene-diene copolymer, acrylonitrile-butadiene copolymer and hydrogenates thereof.

3. The electrode for the all solid-state secondary battery as set forth in claim 1 wherein, said inorganic solid electrolyte is sulfide glass and/or sulfide glass ceramics comprising Li$_2$S and P$_2$S$_5$, or ceramics comprising Li$_2$S, P$_2$S$_5$, and GeS$_2$.

4. The electrode for the all solid-state secondary battery as set forth in claim 1, wherein said conductive adhesive agent layer includes a vulcanization accelerator which accelerates a crosslinking reaction between the sulfur atom included in said inorganic solid electrolyte and carbon carbon double bond of said diene based polymer.

5. An all solid-state secondary battery comprising a positive electrode, a solid electrolyte layer and a negative electrode, wherein
at least one of the positive electrode and the negative electrode is the electrode for the all solid-state secondary battery as set forth in claim 1.

6. A production method of the electrode for the all solid-state secondary battery as set forth in claim 1 comprising,
a step of forming a conductive adhesive agent layer including the conductive particle and the adhesive agent layer binder comprising the diene based polymer having carbon-carbon double bond,
a step of coating an electrode slurry including the binder, the inorganic solid electrolyte having sulfur atom, and the electrode active material on said conductive adhesive agent layer,
a step of drying said electrode slurry which has been coated, and
said step of drying includes a step of drying at 25 to 90° C., and a step of drying at 100 to 200° C.

7. The electrode for the all solid-state secondary battery as set forth in claim 2 wherein, said inorganic solid electrolyte is sulfide glass and/or sulfide glass ceramics comprising $Li_2S$ and $P_2S_5$, or ceramics comprising $Li_2S$, $P_2S_5$, and $GeS_2$.

8. The electrode for the all solid-state secondary battery as set forth in claim 2, wherein said conductive adhesive agent layer includes a vulcanization accelerator which accelerates a crosslinking reaction between the sulfur atom included in said inorganic solid electrolyte and carbon carbon double bond of said diene based polymer.

9. The electrode for the all solid-state secondary battery as set forth in claim 3, wherein said conductive adhesive agent layer includes a vulcanization accelerator which accelerates a crosslinking reaction between the sulfur atom included in said inorganic solid electrolyte and carbon carbon double bond of said diene based polymer.

10. An all solid-state secondary battery comprising a positive electrode, a solid electrolyte layer and a negative electrode, wherein
at least one of the positive electrode and the negative electrode is the electrode for the all solid-state secondary battery as set forth in claim 2.

11. An all solid-state secondary battery comprising a positive electrode, a solid electrolyte layer and a negative electrode, wherein
at least one of the positive electrode and the negative electrode is the electrode for the all solid-state secondary battery as set forth in claim 3.

12. An all solid-state secondary battery comprising a positive electrode, a solid electrolyte layer and a negative electrode, wherein
at least one of the positive electrode and the negative electrode is the electrode for the all solid-state secondary battery as set forth in claim 4.

13. A production method of the electrode for the all solid-state secondary battery as set forth in claim 2 comprising,
a step of forming a conductive adhesive agent layer including the conductive particle and the adhesive agent layer binder comprising the diene based polymer having carbon-carbon double bond,
a step of coating an electrode slurry including the binder, the inorganic solid electrolyte having sulfur atom, and the electrode active material on said conductive adhesive agent layer,
a step of drying said electrode slurry which has been coated, and
said step of drying includes a step of drying at 25 to 90° C., and a step of drying at 100 to 200° C.

14. A production method of the electrode for the all solid-state secondary battery as set forth in claim 3 comprising,
a step of forming a conductive adhesive agent layer including the conductive particle and the adhesive agent layer binder comprising the diene based polymer having carbon-carbon double bond,
a step of coating an electrode slurry including the binder, the inorganic solid electrolyte having sulfur atom, and the electrode active material on said conductive adhesive agent layer,
a step of drying said electrode slurry which has been coated, and
said step of drying includes a step of drying at 25 to 90° C., and a step of drying at 100 to 200° C.

15. A production method of the electrode for the all solid-state secondary battery as set forth in claim 4 comprising,
a step of forming a conductive adhesive agent layer including the conductive particle and the adhesive agent layer binder comprising the diene based polymer having carbon-carbon double bond,
a step of coating an electrode slurry including the binder, the inorganic solid electrolyte having sulfur atom, and the electrode active material on said conductive adhesive agent layer,
a step of drying said electrode slurry which has been coated, and
said step of drying includes a step of drying at 25 to 90° C., and a step of drying at 100 to 200° C.

\* \* \* \* \*